July 27, 1943.    C. B. GODWIN    2,325,392
GEARING
Filed Jan. 24, 1942    8 Sheets-Sheet 1

INVENTOR:
CLIFFORD B. GODWIN,
BY John D. Rippey
HIS ATTORNEY.

July 27, 1943. C. B. GODWIN 2,325,392
GEARING
Filed Jan. 24, 1942 8 Sheets-Sheet 2
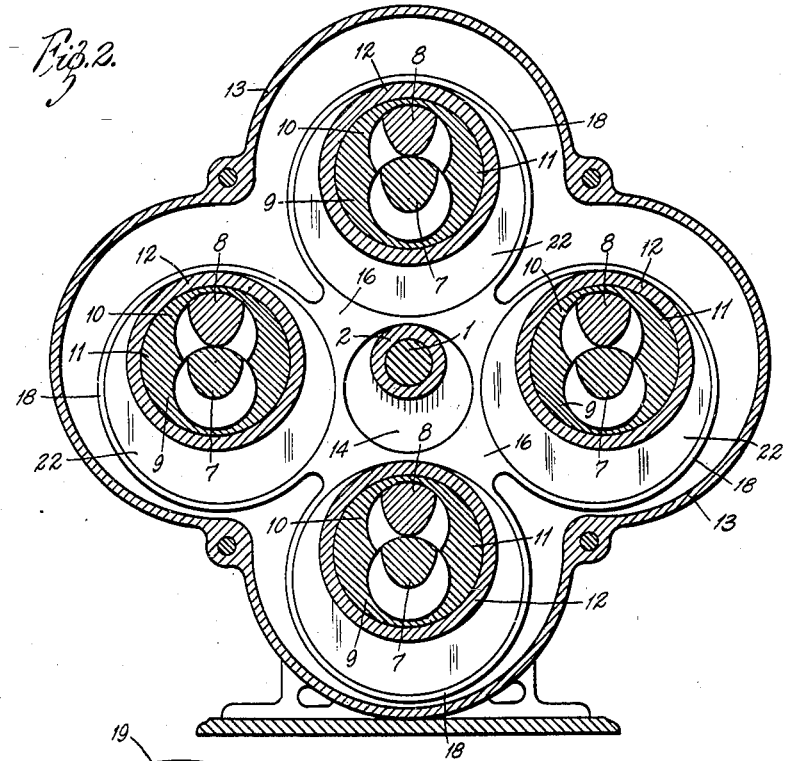
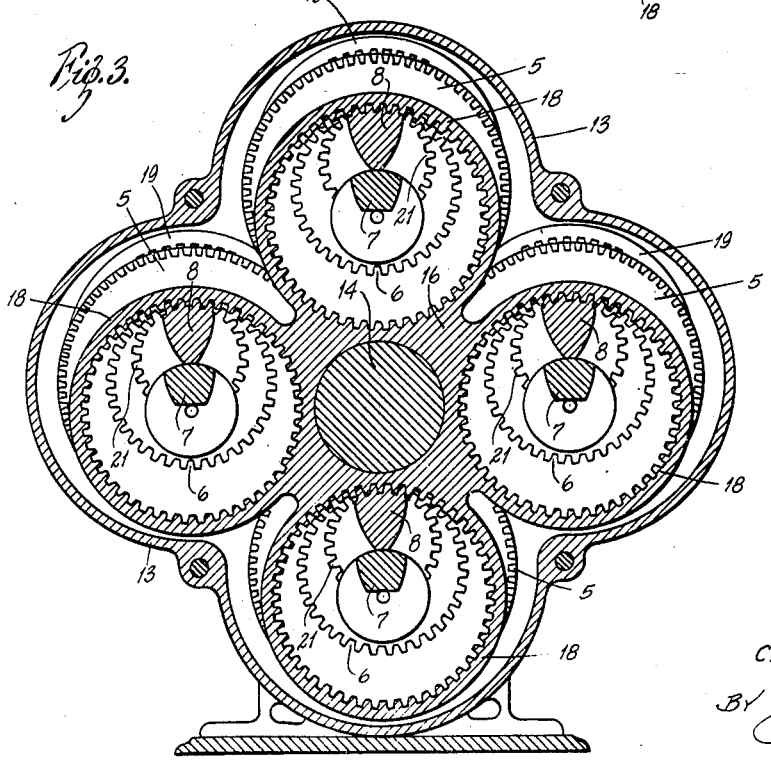
INVENTOR:
CLIFFORD B. GODWIN,
BY John D. Rippey
HIS ATTORNEY.

July 27, 1943.   C. B. GODWIN   2,325,392
GEARING
Filed Jan. 24, 1942   8 Sheets-Sheet 3
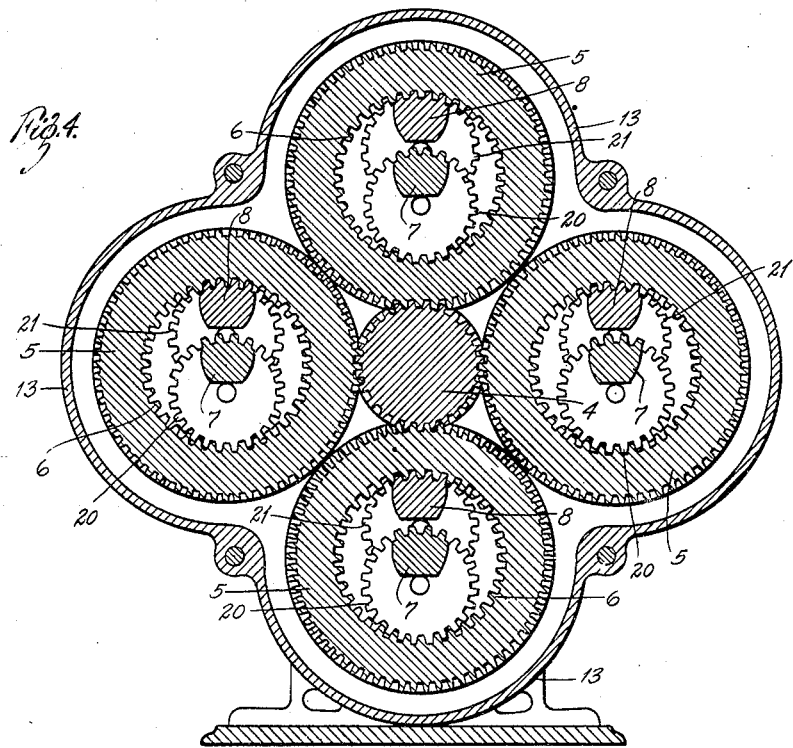
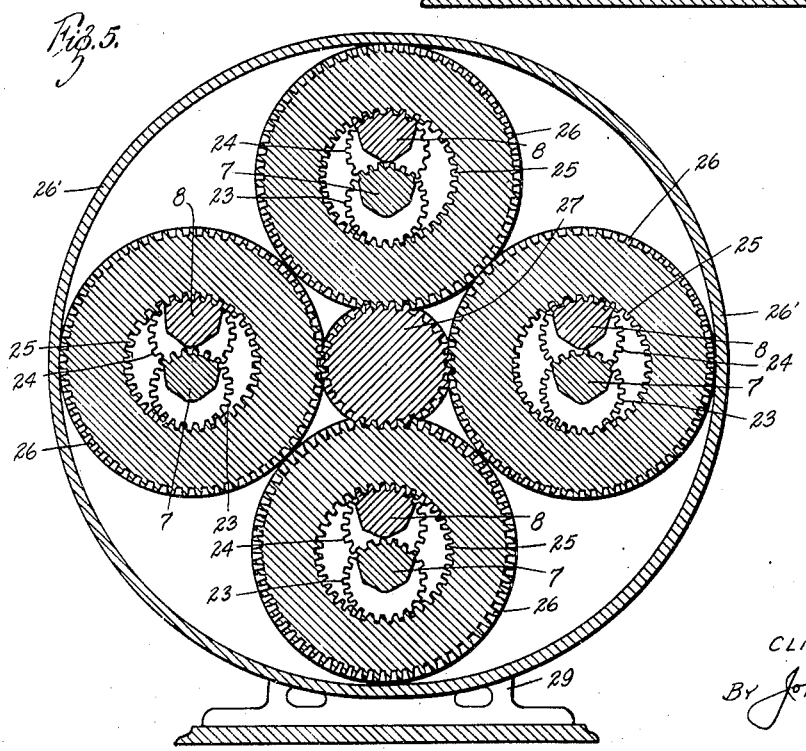
INVENTOR:
CLIFFORD B. GODWIN,
By John D. Rippey
HIS ATTORNEY.

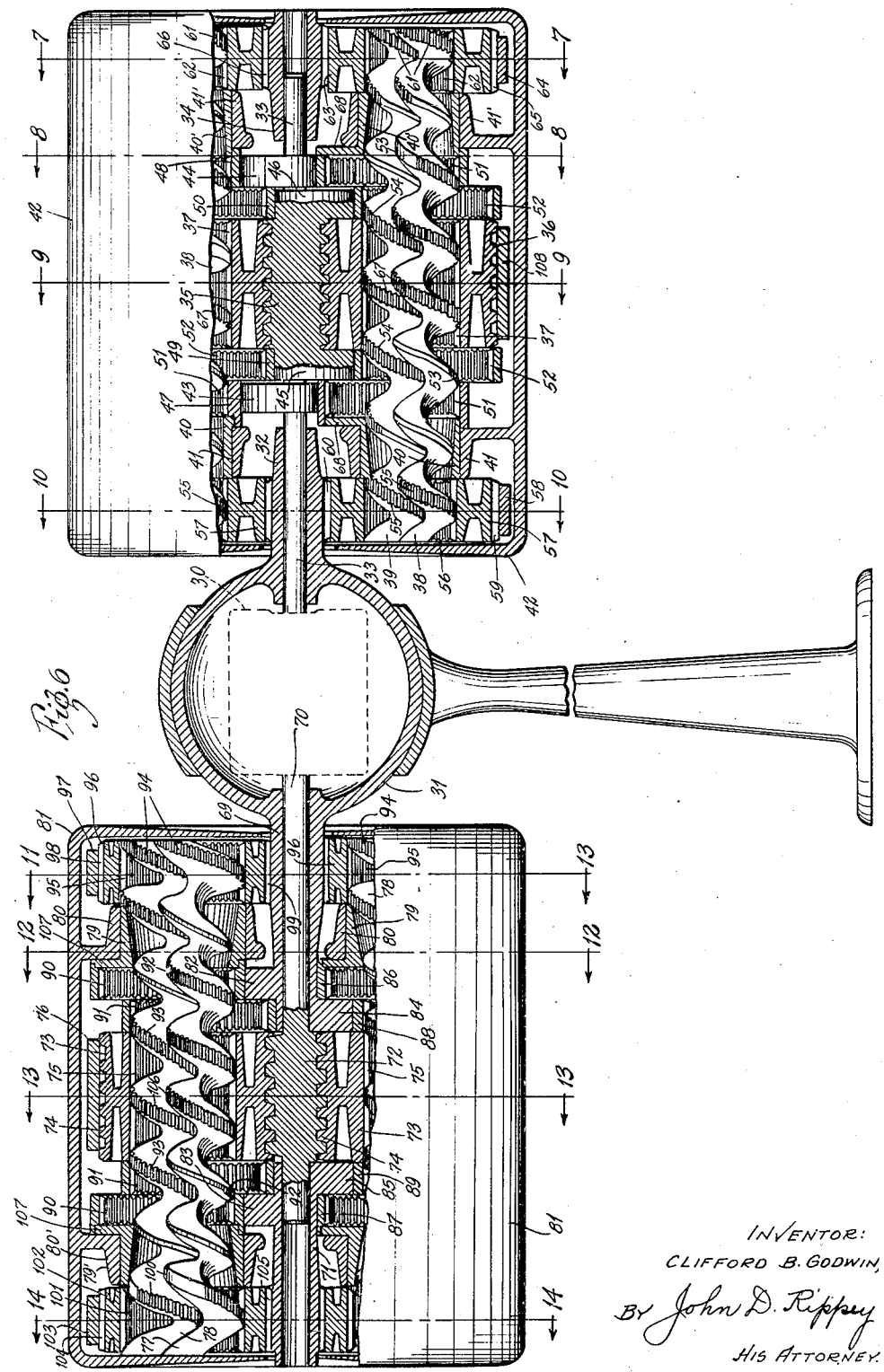

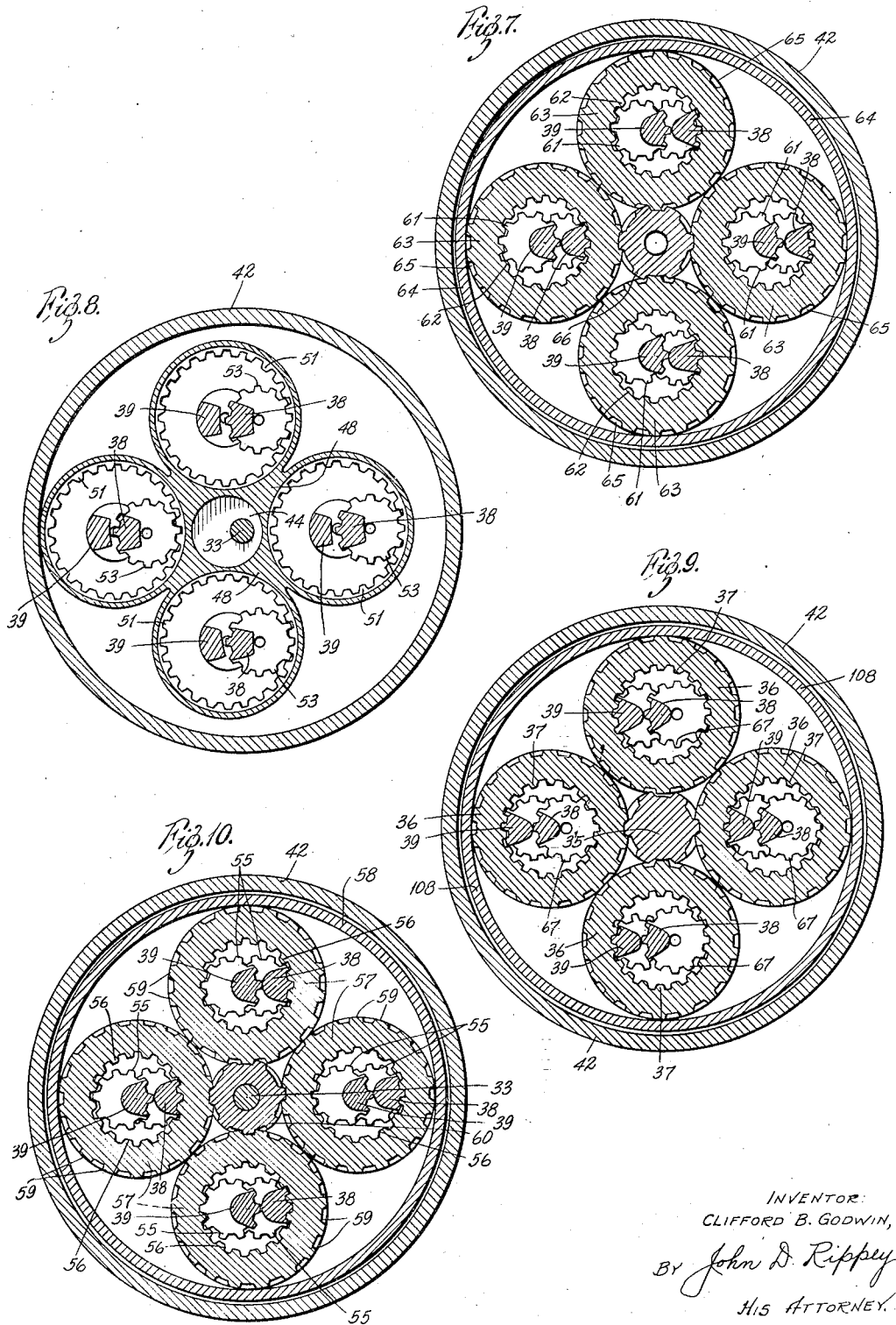

July 27, 1943.   C. B. GODWIN   2,325,392
GEARING
Filed Jan. 24, 1942   8 Sheets-Sheet 6
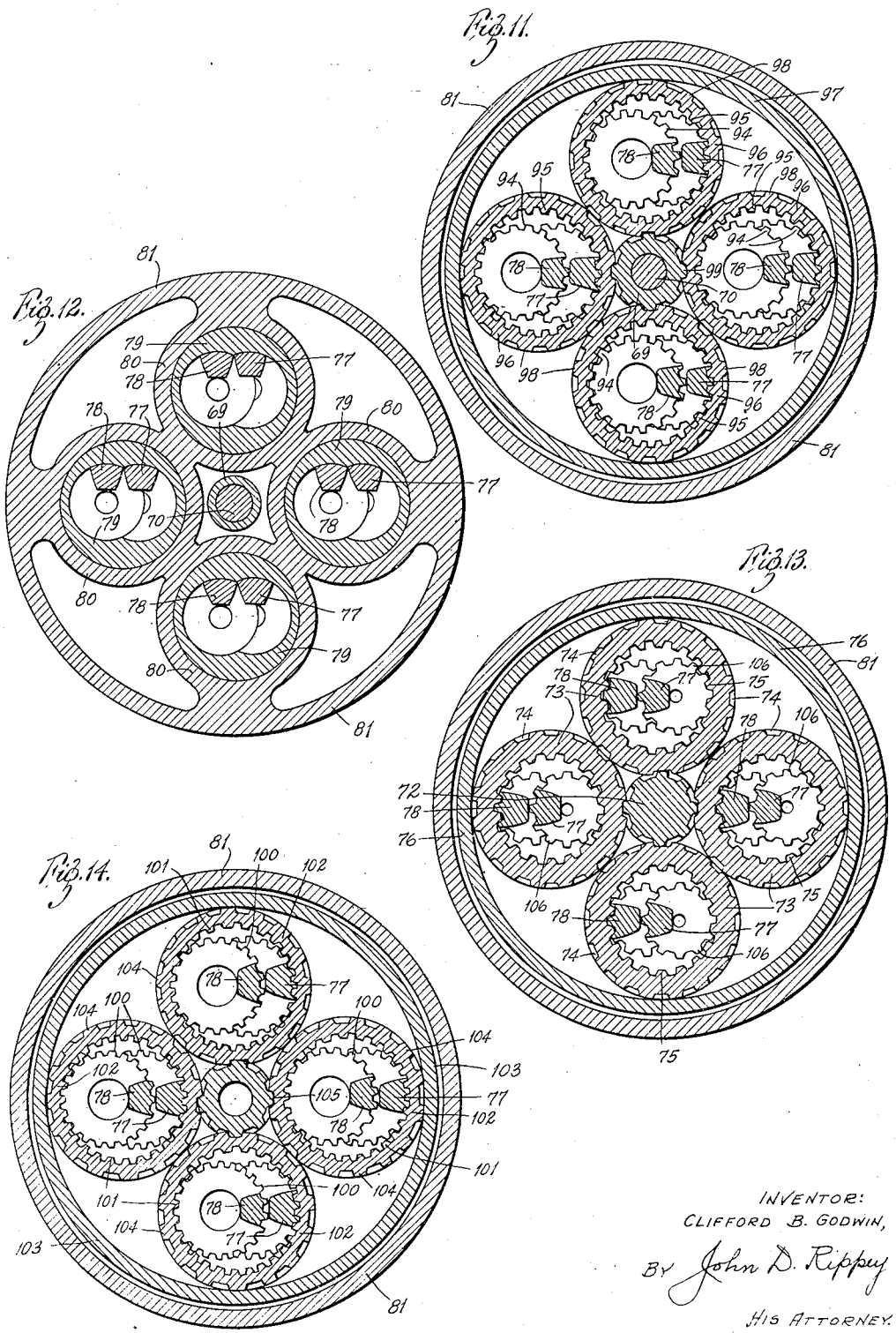
INVENTOR:
CLIFFORD B. GODWIN,
By John D. Rippey
HIS ATTORNEY.

July 27, 1943.  C. B. GODWIN  2,325,392
GEARING
Filed Jan. 24, 1942  8 Sheets-Sheet 7
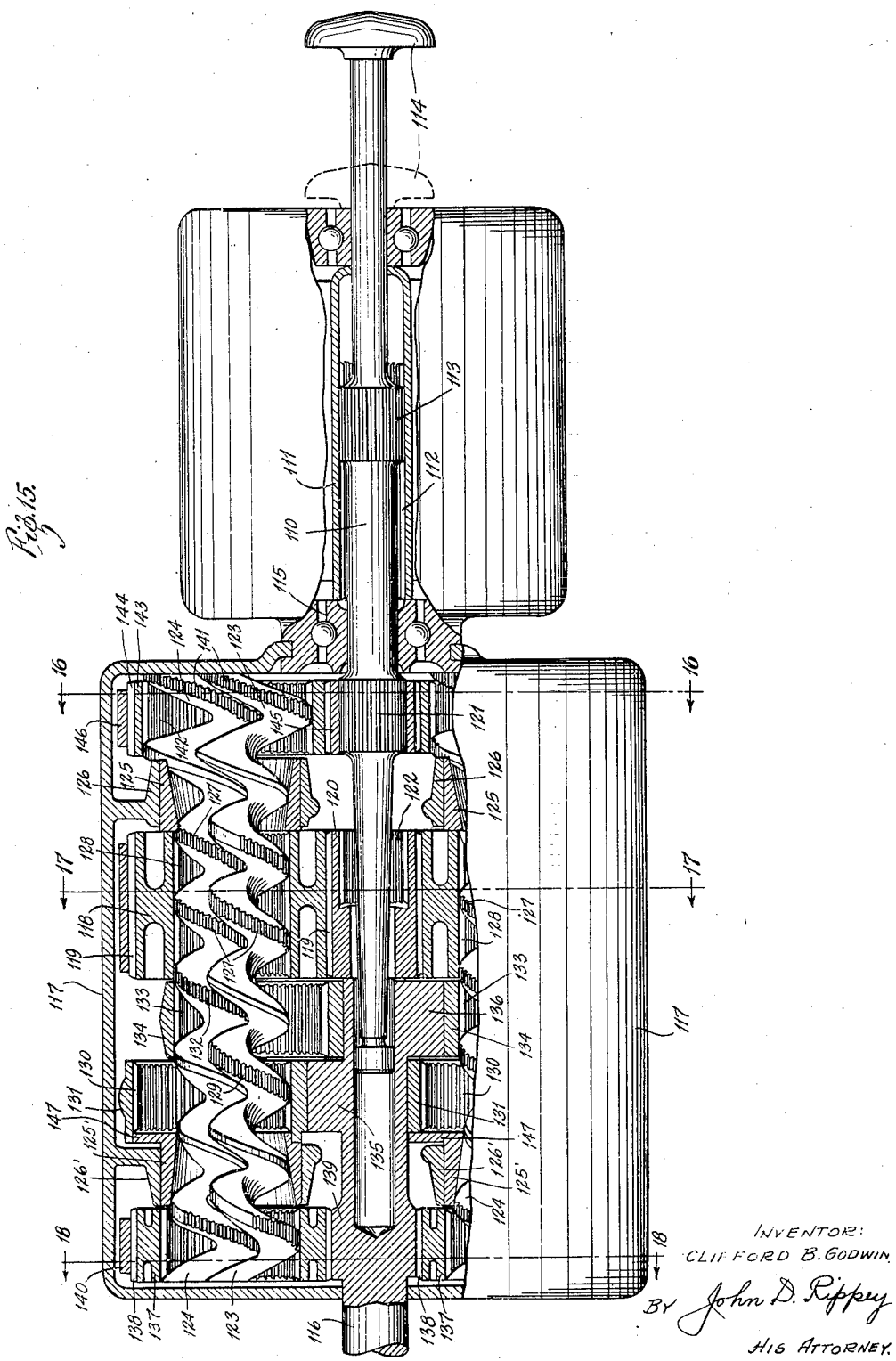
INVENTOR:
CLIFFORD B. GODWIN
By John D. Rippey
HIS ATTORNEY.

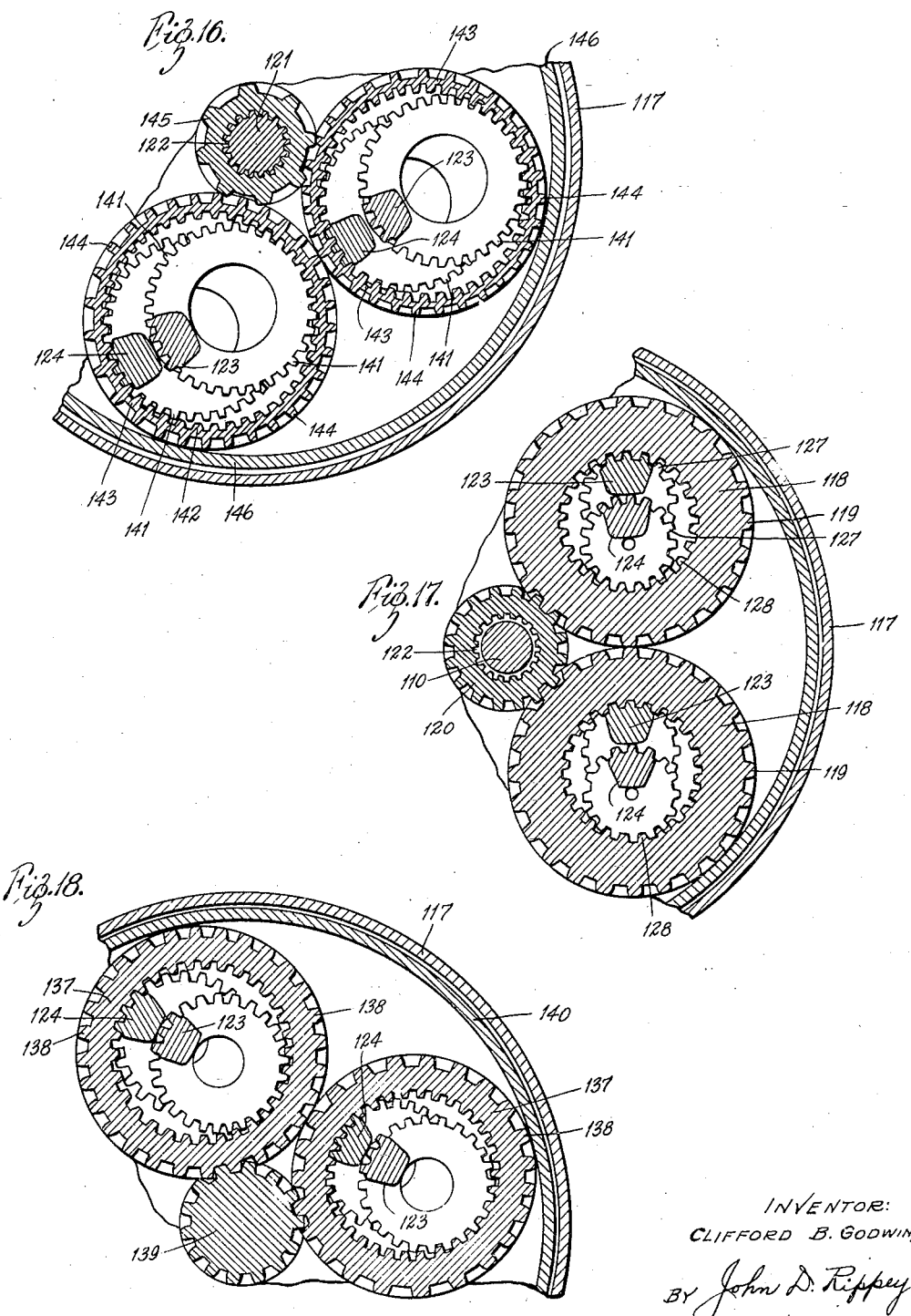

Patented July 27, 1943

2,325,392

UNITED STATES PATENT OFFICE 2,325,392

GEARING

Clifford B. Godwin, University City, Mo.

Application January 24, 1942, Serial No. 428,027

19 Claims. (Cl. 74—305)

This invention relates to gearing.

An object of the invention is to provide a novel type of gearing for transmitting a differential rotary movement from a rotary drive shaft to an ultimate shaft or element to be rotated through the medium of a series of annular gears rotated by the drive shaft and a series of pairs of spiral shafts having integral teeth engaging and rotated by said gears to transmit differential rotary movement to gearing arranged to rotate the ultimate shaft or element that is to be rotated.

Another object of the invention is to provide transmission gearing comprising a central rotary drive shaft formed with a number of eccentrics each supporting an annular series of gears having the gears of each series integrally or rigidly assembled, so that each of said annular series of gears will be moved in an orbital manner but not rotated when said eccentrics are rotated by the drive shaft, a series of annular gears rotated directly by said drive shaft, a series of pairs of spiral shafts having integral gear teeth engaged with and rotated by said last named gears and also engaged with said first named gears and in consequence thereof moved in orbital paths about their longitudinal axes, and gearing driven by said spiral shafts for transmitting their said rotary movements differentially or uniformly to the ultimate shaft or element to be rotated.

Various other objects and advantages will appear from the following description, reference being made to the annexed drawings, in which—

Fig. 2 is a diametrical sectional view approximately on the line 2—2 of Fig. 1.

Fig. 3 is a sectional view on the line 3—3 of Fig. 1.

Fig. 4 is a sectional view on the line 4—4 of Fig. 1.

Fig. 5 is a sectional view on the line 5—5 of Fig. 1.

Fig. 6 is a longitudinal diametrical sectional view showing a modification of the invention.

Figure 1:
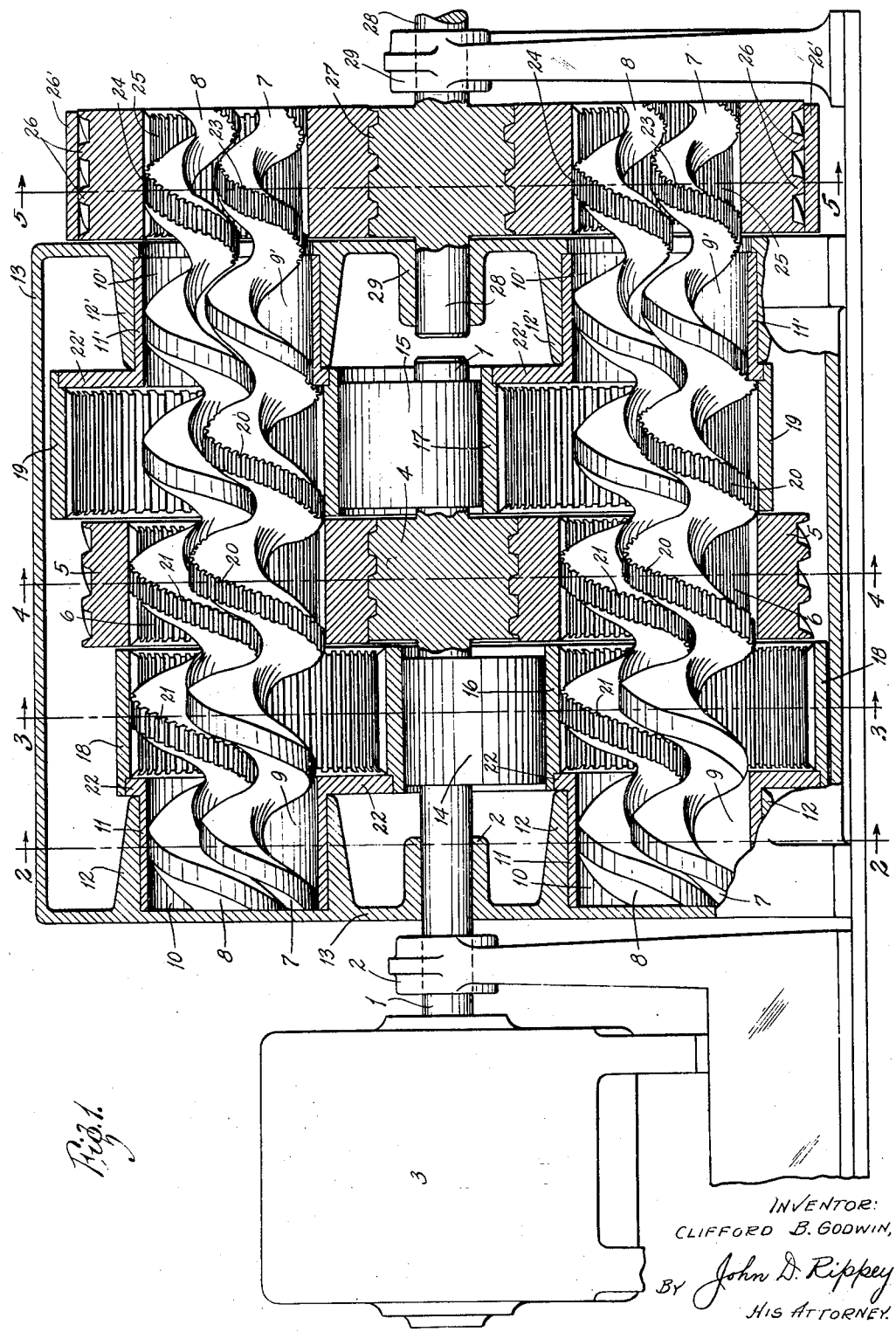
Fig. 1 is a longitudinal diametrical sectional view in elevation of my improved gearing approximately along the axis of the drive shaft.

Figs. 7 to 14, inclusive, are cross-sectional views on the correspondingly designated cross-sectional lines of Fig. 6.

Fig. 15 is a longitudinal diametrical sectional view of another form of my improved gearing in which the drive shaft is movable longitudinally to different adjusted positions.

Figs. 16, 17 and 18 are enlarged cross-sectional views on the correspondingly designated sectional lines of Fig. 15.

The rotary drive shaft 1 is mounted for rotation in bearings 2 by a motor 3 or other power mechanism. In this embodiment of the invention, the shaft 1 is not shiftable longitudinally. Said shaft 1 is formed with a helical gear 4 which is concentric with the axis of the shaft. An annular series or symmetrical cluster of gears 5 have their external helical or spiral teeth engaging the gear 4 for rotation thereby. In the arrangement shown, there are four of the gears 5, all of which mesh with the gear 4 but do not engage each other (Fig. 4). The gears 5 are spaced equidistant about the shaft 1 so that the axes of said gears are spaced 90° apart. The gears 5 are without hubs and have the appearance of rings formed with external helical or spiral teeth meshing with the helical gear 4 and having on their internal peripheries spur gear teeth 6 extending longitudinally parallel with their axes. The helical or spiral formation of the teeth on the external peripheries of the gears 5 prevents interengagement of said external teeth while permitting tangential contact of the external teeth of each gear with the external teeth of the adjacent gear. The axes of the respective gears 5 are fixed relative to each other and to the axis of the shaft 1.

A pair of spiral shafts 7 and 8 extend through each of the gears 5 in side by side relationship. The convolutions forming each of the two shafts 7 and 8 of each pair extend or interpolate between the convolutions of the other shaft of said pair of shafts. By this arrangement, the longitudinal axis of each of said shafts is closer to the periphery of the other shaft than it is to its own periphery, and also is closer to the longitudinal axis of the other shaft than would be the case where adjoining shafts of equivalent diameter but minus convolutions were at minimum spacing. The ends of the shafts 7 that are toward the motor 3 are journalled in bearings 9, and the adjacent ends of the shafts 8 are journalled in bearings 10. The bearings 9 and 10 are formed in bushings 11 rotatively supported in bosses 12 formed rigid with the enclosing frame 13. Thus, each pair of shafts 7 and 8 is complementary to each gear 5 to be positively rotated by said gears as hereinafter explained.

The opposite ends of the shafts 7 and 8 of each pair are supported in similar bearings 9' and 10' formed in a bushing 11' rotatively supported in bosses 12' formed on the enclosing frame 13. The two bushings 11 and 11' are axially alined. Thus, when the bushings 11 and 11' are rotated, the shafts 7 and 8 of each pair are moved or carried through a common, which is to say through the same, orbit about the longitudinal axis of the bushings 11 and 11'. This is because the axes of the shafts 7 and 8 of each pair of shafts are parallel with and spaced equidistant from the common axis of the two alined bushings 11 and 11'; which is to say, the axes of the two shafts 7 and 8 of each pair of said shafts are eccentric with respect to the axis of the bushings 11 and 11'. The axes of the two shafts 7 and 8 of each pair are equidistant from the axis bushings 11 and 11'.

In the construction shown (Fig. 1), a cylindrical eccentric 14 is rigid with the shaft 1 adjacent to the helical or spiral gear 4 and between said gear 4 and the motor 3; and a complementary cylindrical eccentric 15 is rigid on the shaft 1 adjacent to and beyond the opposite end of the gear 4. The two eccentrics 14 and 15 are oppositely disposed so that the high points and surfaces are diametrically opposite from each other. Duplicate units 16 and 17 are mounted on the eccentrics 14 and 15. The units 16 and 17 do not rotate with the shaft 1; but are positively moved bodily through equal circular orbits about the axis of said shaft 1. The radii of the said circular orbits of movement of the units 16 and 17 are equal to the distance from the axis of the shaft 1 to the central axes of the cylindrical eccentrics 14 and 15, respectively. The unit 16 comprises four internal spur gears 18 adjacent to one side of the four gears 5; and the unit 17 comprises four internal gears 19 likewise adjacent to the four gears 5 and located at the opposite end of said gears 5 from the gears 18. The spur gears 18 and 19 are respectively complementary to shafts 7 and 8 which are complementary to the internal gear teeth 6 as a result of common tangency of three dissimilar units. The shafts 7 and 8 extend through the respective gears 18 and 19. Each of the shafts 7 is formed with a spiral series of spur gear teeth 20, and each of the shafts 8 is formed with a spiral series of teeth 21. The spiral series of spur teeth 20 and the spiral series of teeth 21 engage the gears 19 and 18, respectively. When the shaft 1 is rotated, and the two series of gears 18 and 19 are moved through circular orbits, the spiral series of spur teeth 20 and 21 on the shafts 7 and 8 roll along the internal gears 19 and 18, respectively, which are of sufficient diameter to permit the orbital movement thereof by the eccentrics 14 and 15, while also permitting orbital movement of the shafts 7 and 8.

Eccentric flanges 22 formed integral with the bushings 11 have sliding engagement within the ends of the respective gears 18 so that, when said gears 18 are moved in circular orbits about the axis centers of the gears 6, the bushings 11 will be rotated about their own axes and will thereby move and carry the shafts 7 and 8 through circular orbits whose respective axes are extensions of the axes of the gears 5—6. Eccentric flanges 22' formed in integral connection with the bushings 11' have their high points disposed diametrically opposite from the high points of the eccentrics 22 on the bushings 11 that are in alinement with the bushings 11' (Fig. 1). Thus, the radii of the eccentrics 22 extend in the same direction as the radii of complementary portions of the eccentrics 14; and the radii of the eccentrics 22' extend in the same direction as the complementary radii of the eccentrics 15. The cylindrical eccentrics 14 and 15 never apply radial pressure against the hubs of the units 16 and 17; nor do the units 16 and 17 apply direct radial pressure against the eccentrics 22 and 22'. Because of this sliding movement of the eccentrics 14 and 15 against the hubs of the units 16 and 17, said units are bodily moved in identical orbits equidistant from the axis of the shaft 1; and the bearings 9 and 10 are moved in identical orbits about the axes of the bushings 11. These orbital movements of the bearings 9 and 10 about the axes of the alined bushings 11 and 11' carry the shafts 7 and 8 in circular orbits around the axes of said bushings in accompaniment with the orbital movements of the units 16 and 17 and the resulting isolated orbital movements of the gears 18 and 19.

The shafts 7 are formed with spiral series of spur gear teeth 23, and the interpolated spiral shafts 8 are formed with a similar spiral series of spur gear teeth 24. As shown, the spiral series of teeth 23 and 24 are outwardly beyond the bushings 11' and mesh with internal gears 25. There are four of the gears 25, one for each pair of shafts 7 and 8. The gears 25 are formed with external spiral gear teeth 26 which mesh with a spiral gear 27 formed integral or rigid with a shaft 28 rotatively supported in bearings 29. The shaft 28 is in axial alinement with the shaft 1. A ring 26' supports the series of gears 26 as a bearing.

A modified form of the invention is shown in Figs. 6 to 14, inclusive. An electric motor 30 is supported in a rigid spherical frame 31 having at one end a tubular extension 32. The shaft 33 is rotated by the motor and extends through the tube 32 which constitutes a bearing for said shaft. The outer end of the shaft 33 is journalled in a bearing element 34 located in axial alinement with the bearing 32. A helical gear 35 is rigid on the shaft 33. An annular series or symmetrical cluster of gears 36 have their external helical or spiral teeth engaging the gear 35 for rotation thereby. As shown, there are four of the gears 36 all of which mesh with the gear 35 but do not engage each other (Fig. 9). The gears 36 are equal distances apart about the shaft 33 so that the axes of said gears are spaced 90° apart. The gears 36 have on their inner peripheries spur gear teeth 37 extending longitudinally parallel with their axes. The helical or spiral formation of the teeth on the outer peripheries of the gears 36 prevents inter-engagement of said outer peripheral teeth while permitting tangential contact of the outer peripheral teeth of each gear with the outer peripheral teeth of the adjacent gear. The axes of the respective gears 36 are fixed relative to each other.

A pair of spiral shafts 38 and 39 extend through each of the gears 36 in side by side relationship. The convolutions forming each of the two shafts 38 and 39 of each pair extend or interpolate between the convolutions of the other shaft of said pair of shafts. By this arrangement, the longitudinal axis of each of said shafts is closer to the periphery of the other shaft than it is to its own periphery, and also is closer to the longitudinal axis of the other shaft than would be possible if both shafts were of equivalent diameter and without the convolutions which permit minimum spacing. The end portions of each pair of shafts 38 and 39 that are toward the motor 30 are journalled in bearings in a bushing 40 rotatively supported in a boss 41 formed integral with the enclosing frame 42 which, in this instance, may constitute the ultimate tool or element to be operated. Since there are four pairs of shafts 38—39, it is apparent that there are four bushings 40. The bearings in the bushings 40 in which the shafts 38 and 39 are journalled are like the bearings 9 and 10 formed in the bushings 11.

The opposite ends of the shafts 38 and 39 of each pair are supported in similar bearings formed in bushings 40' rotatively supported in bosses 41' formed integral with the enclosing frame 42. The two bushings 40 and 42' are axially alined. Therefore, when said bushings are rotated, the shafts 38 and 39 of each pair are moved through the same circular orbit about the longitudinal axis of said bushings. This is because the axes of the shafts 38 and 39 of each pair of shafts are parallel with each other and are spaced equidistant from the common axis of the two alined bushings 40 and 40'; which is to say, the axes of the two shafts 38 and 39 of each pair of said shafts extend eccentrically with respect to the axes of the two bushings 40 and 40'.

In this modified construction, two cylindrical eccentrics 43 and 44 are rigid with the shaft 1 beyond opposite ends of the helical gear 35 so that said gear is midway between said eccentrics; and complementary cylindrical eccentrics 45 and 46 are rigid on the shaft 1 between the gear 35 and the respective eccentrics 43 and 44. The eccentrics 43 and 44 are formed on a common axis, and the eccentrics 45 and 46 are also formed on a comman axis which is eccentric with respect to the axis of said eccentrics 43 and 44. Thus, as shown, the two adjacent eccentrics 43 and 45 and the two adjacent eccentrics 44 and 46 are oppositely disposed. The high points and surfaces of the eccentrics 43 and 45 are diametrically opposite from each other, and the high points and surfaces of the eccentrics 44 and 46 are also diametrically opposite from each other. Duplicate units 47 and 48 are mounted on the eccentrics 43 and 44; and duplicate units 49 and 50 are mounted on the eccentrics 45 and 46. The said units 47, 48, 49 and 50 do not rotate with the shaft 33, but are rotated about the axes of the respective eccentrics 43, 44, 45 and 46 on which they are mounted, during the same time that they are positively moved bodily through equal circular orbits around the axis of the shaft 33. The rotation of the units 47, 48, 49 and 50 about the axes of the eccentrics 43, 44, 45 and 46 on which said units are mounted is in accompaniment with the rotation of the frame or element 42. This is because the shafts 38 and 39 are carried by said frame or element 42 during rotation of the latter; as a consequence of which the units 47, 48, 49 and 50 are rotated during the same time that they move through their circular orbits. The radii of said circular orbits of movement of the units 47, 48, 49 and 50 are equal to the distance from the axis of the shaft 33 to the central long axis of the cylindrical eccentrics 43, 44, 45 and 46, which are duplicates of each other.

The units 47, 48, 49 and 50 are mounted on their eccentrics 43, 44, 45 and 46 and are operated by said eccentrics, similar in some particulars to the operation of the units 18 and 19 by the eccentrics 14 and 15. A difference between the operation of the units 47, 48, 49 and 50 from the operation of the units 18 and 19 consists in the rotation of said units 47, 48, 49 and 50 about the axes of the eccentrics on which they are mounted: whereas the units 18 and 19 do not rotate.

The units 47 and 48 are adjacent to the bushings 40 and 40', respectively, and each comprises four internal spur gears 51 (Fig. 8). Each of the units 49 and 50 also comprises four internal spur gears 52. The two shafts 38 and 39 of each pair of said shafts extend through the respective gears 51 and 52. Each of the shafts 38 is formed with two spiral series of spur gear teeth 53 engaging both gears 51, and each of the shafts 39 is formed with two spiral series of spur gear teeth 54 engaging both gears 52. When the shaft 33 is rotated by the motor and the series of units 47, 48, 49 and 50 are moved through circular orbits, the spiral series of gear teeth 53 and 54 on the shafts 38 and 39 roll along the internal gears 51 and 52, respectively, which are of sufficient diameter to permit orbital movement of said shafts by the eccentrics 43, 44, 45 and 46.

The inner ends of the shafts 38 and 39 that are toward the motor 30 have spiral series of spur gear teeth 55 meshing with internal teeth 56 formed on the inner peripheries of four gear rings 57, respectively. The rings 57 are of equal diameter and are spaced equidistant about the axis of the shaft 33 so that the axes of said gear rings 57 are spaced 90° apart. The four gear rings 57 are rotatably supported in a bearing ring 58. The rings 57 are formed with external helical gear teeth 59 which engage a fixed helical gear 60 formed on the rigid bearing extension 32. Therefore, when the shafts 38 and 39 are rotated by the gears 36, the series of gear rings 57 will be rolled around the fixed bearing extension 32 in a planetary manner and will cause the enclosing frame 42 which, in this instance, is the ultimate tool or element, to be rotated about the axis of the shaft 33.

Each of said shafts 38 and 39 has on its outer end a spiral series of spur gear teeth 61 (Fig. 7), meshing with internal spur teeth 62 formed on the inner peripheries of four gear rings 63, respectively. The rings 63 are of equal diameter and are spaced equidistant about the extended axis of the shaft 33 so that the axes of said gear rings 63 are spaced 90° apart and in alinement with the axes of the rings 57. The four gear rings 63 are rotatably supported in a ring 64. The rings 63 are formed with external helical gear teeth 65 which engage a fixed helical gear 66 formed on the rigid bearing element 34, which is analogous to the rigid bearing extension 32. Therefore, when the shafts 38 and 39 are rotated by the gears 36, the series of gear rings 63 will be rolled around the rigid bearing element 34 in a planetary manner and will cooperate with the devices 57 to impart a rotary movement to the enclosing frame 42 which, in this instance, represents an ultimate tool or element to be rotated about the axis of the shaft 33.

The axes of the bearings 41 and 41' and the axes of the bushings 40 and 40' are equidistant from the axis of the shaft 33. Also, the axes of the gears 36, 57 and 63 are equidistant from the axis of the shaft 33. Both shafts 38 and 39 of each pair of said shafts have spiral series of spur gear teeth 67 in permanent mesh with the internal teeth 37 of the complementary gear ring 36 (Fig. 9). Therefore, when the motor 30 is operating to rotate the shaft 33 and spiral gear 37, and thereby rotate the gear rings 36 about their respective axes, both shafts 38 and 39 that are engaged with each gear ring 36 are rotated about their respective axes and impart rotary movements to the gear devices 57 and 63, respectively. As a consequence, the frame or ultimate element or tool 42 is rotated about the axis of the shaft 33. The two shafts 38 and 39 of each pair of shafts, during rotation thereof about their respective axes, are also moved through circular orbits because said shafts are journalled in bearings in the bushings 40 and 40' that are eccentric to the axis of said bushings like the bearings 9, 10 and 9' and 10' in the bushings 11 and 11', before described.

Eccentric flanges 68 formed integral with the bushings 40 and 40' have sliding engagement within the ends of the respective adjacent gears 51 so that, when said gears are moved in circular orbits by the eccentrics 43 and 44, the bushings 40 and 40' will be rotated about their own axes and will thereby carry the shafts 38 and 39 through circular orbits about the axes of said bushings which are extensions of the axes of the gears 36.

The opposite end of the mechanism shown in Fig. 6 includes a tubular bearing extension 69 in axial alinement with the bearing extension 32 and, in like manner, rigid with the rigid frame 31. The shaft 70 is rotated by the motor 30 and is journalled in the bearing extension 69 and in a rigid bearing element 71 located in axial alinement with the bearing 69. A helical gear 72 is rigid on the shaft 70. An annular series or symmetrical cluster of four gears 73 have their external helical or spiral teeth 74 engaging the gear 72 for rotation thereby. All four of the gears 73 mesh with the gear 72 but do not mesh with each other (Fig. 13). The gears 73 are equal distances apart about the shaft 70 so that the axes of said gears are spaced 90° apart. The gears 73 have on their inner peripheries spur gear teeth 75 extending longitudinally parallel with their axes. The helical or spiral formation of the teeth 74 on the outer peripheries of the gears 73 prevents interengagement of said outer peripheral teeth 74 while permitting tangential contact of the outer peripheral teeth of each gear with the outer peripheral teeth of the adjacent gear. A ring 76 encloses the series of gears 73 and holds them in proper relationship, and in engagement with the gear 72.

A pair of spiral shafts 77 and 78 extend through each of the gears 73 in side by side relationship. These shafts 77 and 78 are formed exactly like the shafts 38 and 39 and differ therefrom only in dimensions. The convolutions forming each of the two shafts 77 and 78 of each pair extend or interpolate between the convolutions of the other shaft of said pair of shafts, as do the shafts 38 and 39. This arrangement locates the longitudinal axis of each of said shafts 77 and 78 closer to the periphery of the other shaft than it is to its own periphery, and also closer to the longitudinal axis of the other shaft, than would be possible if the two shafts 77 and 78 were of equal diameter and without the convolutions which permit this close assembly. The inner end portions of each pair of shafts 77 and 78 that are toward the motor 30 are journalled in bearings in a bushing 79 rotatively supported in a boss 80 formed integral with the enclosing frame 81 which, in this instance, may constitute the ultimate tool or element to be operated, as does the frame 42, already described. Since there are four pairs of shafts 77 and 78, it is apparent that there are four bushings 79. The bearings in the bushings 79 in which the shafts 77 and 78 are journalled are like the bearings 9 and 10 formed in the bushings 11, and also like the bearings for the shafts 38 and 39 formed in the bushings 40.

The opposite or outer ends of the shafts 77 and 78 of each pair are supported in similar bearings formed in bushings 79' rotatively supported in bosses 80' formed integral with the enclosing frame 81. The two bushings 79 and 79' are axially alined. Therefore, when said bushings are rotated, the shafts 77 and 78 of each pair are moved through the same circular orbit about the longitudinal axis of said bushings. This is because the axes of the two shafts 77 and 78 are parallel with each other and are spaced equidistant from the common axis of the two alined bushings 79 and 79'; which is to say, the axes of the two shafts 77 and 78 of each pair of said shafts extend eccentrically with respect to the axis of the two bushings 79 and 79'.

In this form of the device, two cylindrical eccentrics 82 and 83 are rigid with the stationary bearings 69 and 71, respectively, beyond opposite ends of the helical gear 72 so that said gear is midway between said eccentrics; and complementary cylindrical eccentrics 84 and 85 are rigid on said bearings between the gear 72 and the respective eccentrics 82 and 83. The eccentrics 82 and 83 are formed on a common axis, and the eccentrics 84 and 85 are also formed on a common axis, which is eccentric with respect to the axis of the eccentrics 82 and 83. Thus, as shown, the two adjacent eccentrics 82 and 84 are oppositely disposed, and the two adjacent eccentrics 83 and 85 also are oppositely disposed relative to each other. The high points and surfaces of the eccentrics 82 and 84 are diametrically opposite from each other, and the high points and surfaces of the eccentrics 83 and 85 are also diametrically opposite from each other. Duplicate units 86 and 87 are mounted on the eccentrics 82 and 83; and duplicate units 88 and 89 are mounted on the eccentrics 84 and 85. The said units 86, 87, 88 and 89 do not rotate along with the shaft 70, but are rotated about the axes of the eccentrics 82, 83, 84 and 85 on which they are mounted during the same time that they are positively moved bodily through equal circular orbits around the axis of the shaft 70. The radii of said circular orbits of movement of the units 86, 87, 88 and 89 are equal to the distance from the axis of the shaft 70 to the central long axes of the cylindrical eccentrics 82, 83, 84 and 85 which are of equal size.

The units 86 and 87 are adjacent to the bushings 79 and 79', respectively, and each comprises four internal spur gears 90 similar to the four internal spur gears 51 in the units 47 and 48. Each of the units 88 and 89 also comprises four internal spur gears 91. The two shafts 77 and 78 of each pair of said shafts extend through the respective gears 90 and 91. Each of the shafts 77 is formed with two spiral series of spur gear teeth 92 engaging both gears 90, and each of the shafts 78 is formed with two spiral spur gear teeth 93 engaging both gears 91. When the spiral gear 72 is rotated by the motor and the series of units 86, 87, 88 and 89 are rotated around the axes of the eccentrics 82, 83, 84 and 85, the spiral series of gear teeth 92 and 93 on the shafts 77 and 78 roll along the gears 90 and 91, respectively, which are of sufficient diameter to permit oscillation of the units 86, 87, 88 and 89 relative to the axis of the shaft 70.

The inner ends of the shafts 77 and 78 that are toward the motor 30 have spiral series of spur gear teeth 94 meshing with the internal teeth 95 formed on the inner peripheries of four ring gears 96, respectively. The ring gears 96 are of equal diameter and are spaced equidistant about the axis of the shaft 70 so that the axes of said ring gears 96 are spaced 90° apart. The four ring gears 96 are rotatably supported in a ring 97. The ring gears 96 are formed with external helical gear teeth 98 which engage a fixed helical gear 99 formed on the rigid bearing extension 69. Therefore, when the shafts 77 and 78 are rotated by the gears 75, the series of ring gears 96 will be rolled around the fixed bearing extension 69 in a planetary manner and will cause the enclosing frame 81, which is the ultimate tool or element to be operated, to be rotated about the axis of the shaft 70.

Each of said shafts 77 and 78 has on its outer end a spiral series of spur gear teeth 100 meshing with internal gear teeth 101 formed on the inner peripheries of four ring gears 102. The ring gears 102 are duplicates of the ring gears 96, are of the same diameter, and are spaced equidistant about the extended axis of the shaft 70, so that the axes of said ring gears 102 are spaced 90° apart and are in alinement with the axes of the ring gears 96. The four ring gears 102 are rotatably supported in a ring 103. The ring gears 102 are formed with external helical gear teeth 104 which engage a fixed gear 105 formed on the rigid bearing element 71 which is analogous to the bearing element 34 and to the rigid bearing extension 32. Therefore, when the shafts 77 and 78 are rotated by the gears 75, the series of ring gears 102 will be rolled around the rigid bearing element 71 in a planetary manner and will cooperate with the ring gears 96 to impart a rotary movement to the enclosing frame 81 which, in this embodiment, is the ultimate tool or element to be rotated.

The axes of the bearings 80 and 80' and the axes of the bushings 79 and 79' are equidistant from the common axis of the bearings 69 and 71 and also equidistant from the axis of the shaft 70. Both shafts 77 and 78 of each pair of said shafts have spiral series of spur gear teeth 106 in permanent mesh with the internal teeth 75 of the corresponding ring gear 73. Therefore, when the motor 30 is operating to rotate the spiral gear 72 and thereby rotate the ring gears 73, both shafts 77 and 78 that are engaged with each ring gear 73 are rotated about their respective axes simultaneously with their orbital movements and impart rotary movements to the ring gears 96 and 102, respectively. The frame or ultimate element or tool 81 is rotated about the axis of the shaft 70. The two shafts 77 and 78 of each pair of shafts, during rotation thereof about their respective axes, are moved through circular orbits because said shafts are journalled in bearings in the bushings 79 and 79' that are eccentric to the axis of said bushings like the bearings 9, 10, and 9' and 10' in the bushings 11 and 11', and like the bearings in the bushings 40 and 40', before described.

Eccentric flanges 107 formed integral with the bushings 79 and 79' have sliding engagement within the ends of the respective adjacent gears 90 so that, when said gears are moved by the eccentrics 82 and 83, the bushings 79 and 79' will be rotated about their own axes and will thereby carry the shafts 77 and 78 through circular orbits about the axes of said bushings which are extensions of the axes of the ring gears 73.

As explained, the ring gears 73 are held in assembly and in proper relationship by an encircling ring 76, and a like ring 108 holds the ring gears 36 in proper assembly and in engagement with the spiral gear 35.

In the mechanisms already described, the drive shafts 1, 33 and 70 cannot be moved longitudinally. Therefore, said drive shafts are rotated whenever the motors are running. In Figs. 15 to 18, inclusive, another form of the invention is shown in which the shaft 110 is shiftable longitudinally to different adjusted positions. The drive shaft 110 extends through the rotary motor driven tubular shaft 111 having an inner series of longitudinal spur gear teeth 112 engaged by the pinion 113 rigid on the shaft 110. When the motor is operating, the tubular shaft 111 is in constant rotation. Because the shaft 111 is permanently geared to the shaft 110, said shaft is also rotated constantly when the motor is operating. The shaft 110 may be equipped with a handle 114 beyond the motor frame so that said shaft may be manually moved to its different adjusted positions. The shaft 110 is rotatively supported in bearings 115.

The gear mechanism for operating the ultimate element or tool 116 is supported within a rotatable frame or housing 117. The element 116 is incapable of longitudinal movements and telescopes on the axially alined adjacent end of the shaft 110 (Fig. 15).

An annular series of four ring gears 118 are mounted within the frame 117 and have outer peripheral helical gear teeth 119 meshing with a pinion 120 through which the shaft 110 extends for sliding movements. When the pinion 120 is rotated by the shaft 110, all of the ring gears 118 will also be rotated. A pinion 121 rigid on the shaft 110 is movable into one end of pinion 120 and into engagement with an internal gear 122 formed in said pinion. Therefore, when the shaft 110 is moved longitudinally to the limit of its movement in one direction, the pinion 121 is within and engaged by the gear 122 and will rotate the pinion 120 when the motor is operating. This will rotate the four ring gears 118.

A pair of spiral shafts 123 and 124 extend through each of the ring gears 118 in side by side relationship. These shafts 123 and 124 are like the shafts 38 and 39 and like the shafts 77 and 78 and differ therefrom only in dimensions. The convolutions forming each of the two shafts 123 and 124 of each pair extend or interpolate between the convolutions of the other shaft of said pair of shafts, as do the shafts 38 and 39 and the shafts 77 and 78. This arrangement locates the longitudinal axis of each of said shafts 123 and 124 closer to the periphery of the other shaft than it is to its own periphery, and also closer to the longitudinal axis of the other shaft, than would be possible if the two shafts 123 and 124 were of equal diameter and without the convolutions which permit this close assembly. The inner end portions of each pair of shafts that are toward the motor are journalled in bearings in a bushing 125 rotatively supported in a bearing boss 126 formed integral with the enclosing frame 117. Since there are four pairs of shafts 123 and 124, it is apparent that there are four bushings 125. The bearings in the bushings 125 in which the shafts 123 and 124 are supported are like the bearings 9 and 10 formed in the bushings 11.

The opposite or outer ends of the shafts 123 and 124 are supported in similar bearings formed in bushings 125' rotatively supported in bearing bosses 126'. The bushings 125 and 125' are axially alined so that, when said bushings are rotated, the shafts 123 and 124 of each pair are moved through the same circular orbit about the longitudinal axis of said bushings. This is because the axes of the shafts 123 and 124 are parallel with each other and are spaced equidistant from the common axis of the two alined bushings 125 and 125'. Each shaft 123 and 124 has a spiral series of gear teeth 127 permanently meshing with internal spur gear teeth 128 formed in the respective ring gears 118.

Each shaft 123 has a spiral series of spur gear teeth 129 engaging the internal spur gear teeth 130 formed in the unit 131. The unit 131 has four gears 130 engaging, respectively, the four shafts 123. The unit 131 is like the unit 18 and is similarly operated. Each shaft 124 has a spiral series of spur gear teeth 132 engaging the internal spur gear teeth 133 formed in the unit 134. The unit 134 has four gears 133 engaging, respectively, the four shafts 124. The shafts 123 do not engage the gears 133; and the shafts 124 do not engage the gears 130. The unit 131 is mounted on an eccentric 135, and the unit 134 is mounted on an eccentric 136. The eccentrics 135 and 136 are formed on the element 116 for rotation thereby to move the units 131 and 134 through orbits in the same manner that the units 82 and 84 are moved through orbits.

A series of four ring helical gears 137 have their outer peripheral teeth 138 permanently engaging a helical gear 139 formed on the element 116. The series of ring gears 137 are held in assembly and in engagement with the gear 139 by a retaining ring or frame 140. Thus, when the shafts 123 and 124 are rotated by the ring gears 118, the element 116 will be rotated at a predetermined speed by the ring gears 137 which are engaged with the shafts 123 and 124.

The shafts 123 and 124 have a spiral series of spur gear teeth 141 meshing with the internal gear teeth 142 formed in a series of four ring gears 143. The outer peripheral teeth 144 on the ring gears 143 mesh with a pinion 145 which is engaged by the pinion 121 (Fig. 15) in one of the longitudinal positions of the shaft 110. Therefore, when the pinion 121 is engaged within the pinion 145, the latter will be rotated by the shaft 110, thereby rotating the series of ring gears 143 and rotating the shafts 123 and 124. This will rotate the ring gears 137 at a speed different from the speed at which said ring gears 137 are rotated by the shafts 123 and 124 when said shafts are rotated by the gears 118, because the ring gears 118 and 143 are of different diameters and, therefore, rotate the shafts 123 and 124 at different speeds. As a consequence, the element 116 may be rotated at different speeds when the motor is operating the tubular shaft 111 at uniform speed. The pinion 121 may be moved to an intermediate idle position in which said pinion 121 is out of engagement with the gear 122 and also out of engagement with the pinion 145. This permits the motor to operate without operating the gearing, or the element 116.

The series of ring gears 143, and thereby the pinion 145, are held in proper relationship and assembly by a ring 146, like the rings 58 and 64.

The bushings 125' are rotated by eccentrics 147 formed integral with said bushings and engaging in the adjacent ends of the gears 130 formed in the units 131. Thus, the bushings 125' are rotated by the orbital movements of the unit 131. When the bushings 125' are rotated, the shafts 123 and 124 are moved in orbits about the axes of said bushings and, as a consequence, impart rotary movements to the bushings 125.

From the foregoing, it is apparent that my improved gearing in either of its embodiments is more compactly assembled than would be possible in other gearings in which the parts were of different form and shape. The varied embodiments of the gearing may be used to impart a differential rotary movement from a rotary drive shaft to an ultimate shaft or element 28, 42, 81 or 116, through the medium of a series of gears rotated by the drive shaft, and a series of pairs of helical or spiral gear shafts engaged by said gears and rotated about the axes of said spiral shafts and also moved in an orbital manner. Moreover, the axes of all of the shafts and gears are parallel with each other irrespective of the fact that orbital movements are imparted to certain of said gears while rotary movements only are imparted to others of said gears. The problem of assembling the device within a comparatively small or limited space is thus solved; and, due to the rotary or pivotal action of all of the elements, the frictional resistance to the movements of different parts by other parts is reduced to a minimum. The mechanism may be applied to various useful purposes by proper adaptation within the skill of those familiar with such transmission gearings. The present invention has to do with the assembly of the mechanism within minimum space in which the axes of all of the shafts and gears are parallel and in which the ultimate element or tool to be operated may be driven differentially or not, as desired.

The construction, arrangement and relationship of the elements may be varied within the range of equivalent limits without departure from the nature and principle of the invention.

I claim:

1. Gearing of the character described comprising a rotary drive shaft, a series of annular gears rotated by said drive shaft and each having a series of internal gear teeth, a series of pairs of rotary spiral gear shafts extending through said gears and engaging said internal teeth for rotation thereby and having their convolutions interpolated with the longitudinal axis of each of said shafts closer to the periphery of the other shaft of said pair than it is to its own periphery, mechanism for moving said spiral shafts through orbital circuits during rotation thereof by said annular gears, and an element operated by said spiral shafts.

2. Gearing of the character described comprising a central rotary drive shaft, an eccentric in rigid connection with and rotated by said shaft, an annular series of attached gears mounted on said eccentric for oscillation thereby during rotation of said drive shaft, a series of annular gears rotated directly by said drive shaft, a series of pairs of spiral shafts having integral gear teeth engaged with and rotated by said respective last named gears and also engaged with said first named gears and thereby moved in orbital paths about their longitudinal axes when said drive shaft is rotated, an element to be rotated, and gearing driven by said spiral shafts for transmitting rotary movements to said element.

3. Gearing of the character described comprising a rotary drive shaft, a series of annular gears rotated directly by said drive shaft and each having a series of internal gear teeth, a pair of rotary spiral gear shafts extending through each of said gears and engaging said internal teeth for rotation thereby, a device oscillated by said drive shaft during rotation thereof for moving said spiral shafts through circular orbits during rotation of said spiral shafts by said annular gears, an element to be operated, and mechanism driven by said spiral shafts for operating said element.

4. Gearing of the character described comprising a central rotary drive shaft, a series of annular gears rotated directly by said drive shaft and each having a series of internal gear teeth, a pair of rotary spiral gear shafts extending through each of said gears engaging and rotated by said internal gear teeth and having their convolutions interpolated, mechanism for moving said spiral shafts through orbital circuits during rotation thereof by said annular gears, an element to be operated, and means for connecting said spiral shafts with said element for rotating said element and for moving said spiral shafts generally in a circular path of movement around said drive shaft.

5. Gearing of the character described comprising a rotary drive shaft, a shaft to be rotated, a shaft extending through said drive shaft and being movable longitudinally to different adjusted positions, an element to be rotated, a series of pairs of rotary spiral gear shafts, mechanism for rotating said element by said spiral gear shafts, mechanism for rotating said second shaft by said longitudinally movable shaft in one of the adjusted positions of the latter and thereby rotating said spiral shafts to rotate said element, and gearing operated by said longitudinally movable shaft in another position thereof for rotating said spiral shafts and thereby rotating said element.

6. Gearing of the character described comprising a rotary drive shaft, a pair of longitudinally spaced axially alined bushings, bearings in which said bushings are supported for rotation, a pair of shafts rotatively journalled in said bushings, gearing operated by said drive shaft for rotating said pair of shafts relative to said bushings, mechanism for rotating said bushings and thereby moving said pair of shafts in circular orbits about the axes of said bushings, and an element operated by said pair of shafts.

7. Gearing of the character described comprising a rotary drive shaft, a pair of shafts, a pair of axially alined bushings supporting said pair of shafts for rotation and for orbital movements about a longitudinal axis which is concentric with the axis of said pair of bushings and eccentric to the axes of said pair of shafts, mechanism operated by said drive shaft for rotating said pair of shafts about their respective axes and for moving said pair of shafts in circular orbits about said longitudinal axis, an element to be operated, and gearing operated by said pair of shafts for operating said element.

8. Gearing of the character described comprising a rotary drive shaft, a series of pairs of shafts, means for supporting each of said pairs of shafts for simultaneous rotation and for orbital movements about a longitudinal axis which is eccentric to the axes of said pairs of shafts, mechanism operated by said drive shaft for rotating said pairs of shafts about their respective axes and for moving said respective pairs of shafts in circular orbits about said longitudinal axis, and an element rotated by said pairs of shafts.

9. Gearing of the character described comprising a rotary drive shaft, an eccentric supported and rotated by said drive shaft, a gear member supported by said eccentric and oscillated thereby when said eccentric is rotated by said drive shaft, a pair of longitudinally spaced axially alined bushings, bearings in which said bushings are supported for rotation, a pair of shafts rotatively journaled in said bushings eccentrically of the axes of said bushings and having one of said pairs of shafts engaging said gear member, gearing operated by said drive shaft for rotating said pair of shafts relative to said bushings, means for rotating said bushings by said gear member to move said pair of shafts in circular orbits about the longitudinal axis of said bushings, and an element operated by said pair of shafts.

10. Gearing of the character described comprising a rotary drive shaft, a pair of shafts, a pair of axially alined bushings supporting said pair of shafts parallel with said drive shaft for rotation about their respective axes and for orbital movements about a longitudinal axis parallel with the axis of said shafts and which is concentric with the axis of said pair of bushings and eccentric to the axis of said drive shaft and also eccentric to the axes of said pair of shafts, mechanism operated by said drive shaft for rotating said pair of shafts about their respective axes, means controlled by said drive shaft for moving said pair of shafts in circular orbits about said longitudinal axis, and an element driven by said pair of shafts.

11. Gearing of the character described comprising a rotary drive shaft, a series of pairs of shafts supported for rotation about their respective axes and also for orbital movements about longitudinal axes which are eccentric to the axes of said respective pairs of shafts, mechanism supported and operated by said drive shaft for rotating said pairs of shafts about their respective axes and for moving said pairs of shafts in said circular orbits, and an element operated by said pairs of shafts.

12. Gearing of the character described comprising a rotary drive shaft, a series of pairs of shafts supported for rotation about their respective axes and for orbital movements about longitudinal axes which are eccentric to the axes of said respective pairs of shafts, mechanism operated by said drive shaft for rotating said pairs of shafts about their respective axes, gear members engaged with the respective shafts of said pairs of shafts, means for moving said pairs of shafts generally in a circular direction about the axis of said drive shaft and thereby moving said gear members, eccentrics for oscillating said gear members to control said pairs of shafts, and an element operated by said pairs of shafts.

13. Gearing of the character described comprising a rotary drive shaft, a stationary pinion coaxial with said drive shaft, a series of gears meshing with said pinion, a pair of shafts supported for rotaton about the respective axes and for orbital movements about a longitudinal axis which is eccentric to the axis of said pinion and also eccentric to the axes of said pair of shafts, mechanism operated by said drive shaft for rotating said pair of shafts about their respective axes and for moving said pair of shafts in circular orbits about said longitudinal axis, means engaging said pair of shafts with said gears, and an element rotated by said pair of shafts.

14. Gearing of the character described comprising a rotary drive shaft, two longitudinally spaced pinions coaxial with said drive shaft, series of gears meshing with said pinions respectively, pairs of shafts supported for rotation about their respective axes and for orbital movements about longitudinal axes which are eccentric to the axes of said respective pairs of shafts, gear teeth engaging said pairs of shafts with said respective gears, mechanism operated by said drive shaft for rotating said pairs of shafts about their respective axes and for moving said pairs of shafts in circular orbits about said longitudinal axes, and an element rotated by said pairs of shafts.

15. Gearing of the character described comprising a rotary drive shaft, a shaft rotated by said drive shaft and movable to selected adjusted positions, pinions rotated by said second shaft in the respective adjusted positions thereof, gearing rotated by each of said pinions when said respective pinions are rotated, a pair of shafts engaged with said second gearing for rotation thereby, mechanism for moving said pairs of shafts in circular orbits about longitudinal axes which are eccentric to the axes of said respective shafts, and an element operated by said pairs of shafts.

16. Gearing of the character described comprising a rotary drive shaft, an element to be rotated, gears supported for rotation, means for rotating said gears by said drive shaft, a pair of shafts rotated by said gears and supported for orbital movements about a longitudinal axis which is eccentric to the axis of said drive shaft and also eccentric to the axes of said pair of shafts, means for moving said pair of shafts through circular orbits during rotation of said pair of shafts by said gears, and an element rotated by said pair of shafts.

17. Gearing of the character described comprising a rotary drive shaft, an annular series of ring gears rotated by said drive shaft and each having internal gear teeth, pairs of gear shafts extending through and engaging each of said gears for rotation thereby, means for supporting said respective pairs of shafts for orbital movements about longitudinal axes which are eccentric to the axes of said pairs of shafts respectively, internal gear members each engaging one shaft of said respective pairs of shafts, mechanism for oscillating said gear members and moving said pairs of shafts in circular orbits about said longitudinal axes during rotation of said pairs of shafts, a series of gears respectively engaging both shafts of said pairs of shafts for rotation thereby, and an element rotated by said gears.

18. Gearing of the character described comprising a rotary drive shaft, an element coaxial with said drive shaft and supported for rotation, a series of pairs of shafts supported for rotation about their respective axes and for orbital movements about longitudinal axes which are eccentric to the axes of said respective pairs of shafts, gearing operated by said drive shaft for rotating both shafts of said respective pairs of shafts, mechanism operated by said drive shaft for moving said pairs of shafts in circular orbits about longitudinal axes which are eccentric to the longitudinal axes of said respective shafts, and gearing engaging both shafts of said respective pairs of shafts for operation thereby.

19. Gearing of the character described comprising a rotary drive shaft, an element coaxial with said drive shaft and supported for rotation, a series of pairs of shafts supported for rotation about their respective axes and for orbital movements about longitudinal axes which are eccentric to the axes of said respective pairs of shafts, gearing operated by said drive shaft for rotating both shafts of said respective pairs of shafts, mechanism operated by said drive shaft for moving said pairs of shafts in circular orbits about longitudinal axes which are eccentric to the longitudinal axes of said respective shafts, gearing engaging both shafts of said respective pairs of shafts for operation thereby, and mechanism engaged and rotated by said gearing.

CLIFFORD B. GODWIN.